United States Patent [19]
Sheahan et al.

[11] Patent Number: 5,787,667
[45] Date of Patent: Aug. 4, 1998

[54] MOLDED SIMULATED STONE PRODUCT AND METHOD

[76] Inventors: John J. Sheahan, 14806 Hickory Post Ct., Centreville, Va. 22020; Brian W. Sheahan, 1517 N. Roads St., Apt. 2, Arlington, Va. 23209; Kenneth R. Augst, Jr., 6021 Berwynd Rd., Fairfax, Va. 22030

[21] Appl. No.: 661,343

[22] Filed: Jun. 14, 1996

[51] Int. Cl.⁶ .................... B44F 9/04; E04C 2/26
[52] U.S. Cl. ................. 52/315; 52/211; 52/309.1; 52/316; 52/612; 52/717.01; 52/DIG. 7; 428/15; 428/147; 428/150; 428/327
[58] Field of Search ............... 52/36.3, 204.5, 52/204.53, 211, 287.1, 288.1, 309.1, 309.16, 311.1, 315, 316, 596, 609, 612, 716.1, 717.01, 717.04, 721.1, DIG. 7; 428/15, 67, 114, 141, 147, 150, 174, 327

[56] References Cited

U.S. PATENT DOCUMENTS

| | | |
|---|---|---|
| 3,055,148 | 9/1962 | Christy . |
| 3,371,135 | 2/1968 | Goodwin . |
| 3,660,214 | 5/1972 | Nichols, Jr. et al. . |
| 3,778,945 | 12/1973 | Medow . |
| 3,874,140 | 4/1975 | Seehusen . |
| 3,891,178 | 6/1975 | Kelsey . |
| 3,910,000 | 10/1975 | Kelsey . |
| 3,924,037 | 12/1975 | Sullivan . |
| 3,949,125 | 4/1976 | Roberts .................... 428/99 |
| 4,145,860 | 3/1979 | Wotherspoon . |
| 4,211,686 | 7/1980 | Nishikawa et al. ............ 523/513 |
| 4,233,413 | 11/1980 | Monma et al. .............. 525/168 |
| 4,346,050 | 8/1982 | Trent et al. . |
| 4,389,824 | 6/1983 | Anderson .................... 52/211 |
| 4,473,673 | 9/1984 | Williams et al. . |
| 4,608,795 | 9/1986 | Neuschaeffer et al. . |
| 4,619,093 | 10/1986 | Gandillon . |
| 4,644,719 | 2/1987 | Salazar . |
| 4,696,839 | 9/1987 | Renker et al. . |
| 4,945,692 | 8/1990 | Gallier .................... 52/36.3 |
| 4,961,995 | 10/1990 | Ross et al. . |
| 5,022,925 | 6/1991 | Surguchev et al. . |
| 5,134,814 | 8/1992 | Hauser .................... 52/211 X |
| 5,173,337 | 12/1992 | Nelson . |
| 5,199,237 | 4/1993 | Juntunen ................. 52/287.1 |
| 5,275,852 | 1/1994 | Jones et al. . |
| 5,280,051 | 1/1994 | Traverso et al. . |
| 5,372,676 | 12/1994 | Lowe . |
| 5,398,469 | 3/1995 | Logan .................. 52/287.1 X |
| 5,403,631 | 4/1995 | Sato et al. .............. 52/309.1 X |
| 5,422,391 | 6/1995 | Inoue . |
| 5,478,390 | 12/1995 | Cruaud et al. . |

*Primary Examiner*—Carl D. Friedman
*Assistant Examiner*—Kevin D. Wilkens
*Attorney, Agent, or Firm*—Dennis H. Lambert

[57] ABSTRACT

An inexpensive, lightweight, strong and durable casting that has a surface appearance simulating carved stone, and is especially adapted for use as a transition between a brick or stone wall and window and door openings. Further, it provides architectural detail to building constructions, especially as a surround for window and door openings. The casting is produced from a mixture of graded aggregates and a resin binder, combined in predetermined proportions to make a soupy mixture that is cast in a mold. The mold is vibrated to cause migration of air bubbles away from the surface of the molded product, and to cause realignment and orientation of the aggregate materials in a way to enhance the structure and surface density of the product. After the casting has set, it is removed from the mold and cured and the surface is sandblasted to erode away some of the resin binder and portions of the aggregate at the surface to produce an appearance that is an accurate simulation of carved stone. The cast product, when used as a trim component for architectural detail in building construction, may have shaped portions to accommodate straight runs of brick or stone work, minimizing the need for cutting or shaping the bricks or stones to fit around the casting.

21 Claims, 6 Drawing Sheets

MOLDED SIMULATED STONE PRODUCT AND METHOD

BACKGROUND OF THE INVENTION

1. Field of the Invention

The present invention relates to simulated stone products and to the method of making them. More particularly, the invention relates to simulated stone building components used for architectural detail in residential and commercial buildings.

2. Description of the Prior Art

Historically, carved limestone has been a preferred material for window surrounds, fireplaces and other decorative features, for use with brick or natural stone on expensive, estate-type residences. It has also been used extensively on many institutional and class "A" office buildings. However, carved limestone is heavy and difficult to handle by workmen, and depending upon the size may require the use of machinery to lift it. In addition, in more recent times carved limestone and other stone carvings have become prohibitively expensive and have been dropped from general use in the second half of this century.

There is a long history of the search for a material which provides the look of traditional carved stone at a more economical cost, and many substitute materials have been developed with varying degrees of success. Examples of some prior art attempts are disclosed in U.S. Pat. No. 4,346,050 (Trent), 4,473,673 (Williams), 5,275,582 (Jones), 5,422,391 (Inoue) and 5,478,390 (Cruaud).

The Trent patent is directed to an improved concrete product having a very low viscosity (no more than about 50 centipoise) polyester resin binder so that the concrete will have higher strength and other improved properties such as high modulus of elasticity, low thermal expansion and contraction, better fire resistance and low shrinkage on curing. The improved concrete product disclosed in this patent is intended for use in the production of pre-cast elements for architectural or engineering applications in building construction. In order to achieve different surface appearances for various architectural uses, the surface of the concrete product described in this patent can be treated or etched with any solvent for the polymer binder so that an exposed aggregate effect is obtained.

The Williams patent is concerned with the production of a simulated or cultured marble product, and mixes an unsaturated polyester resin having a viscosity of about 300–600 centipoise (CPI) with a solid filler material such as calcium carbonate and then subjects the composition to a three step process, i.e., evacuating, vibrating and shearing under carefully controlled and limited conditions. The resulting product has a smooth, glossy surface finish and is particularly suitable for use in making countertops, bathroom sinks, table tops, lamps, etc.

The Jones patent is concerned with a simulated stone product for use as a basic building component and uses a resin binder with sodium chloride particles, pigments and other fillers to yield desired aesthetic effects. The mixture is cast in a mold that has been coated with a gel coat to produce countertops, sinks, tubs, etc. The resulting product has a glossy surface finish, and because of the use of sodium chloride has a high degree of whiteness.

The patent to Inoue describes a method of making a high density artificial stone having physical properties similar to those of natural stone, e.g., marble. In producing his product, Inoue molds a mixture of natural stone particles with calcium carbonate filler and a resin binder. Various colors may be given to the finished product by using colored particulate materials, or introducing pigments. The surface of the cast product is processed with an organic solvent to remove resins. Alternatively, the surface may be given an uneven texture by scraping the surface with a wire brush or the like, or spraying it with a high pressure water jet.

The patent to Cruaud relates to a process of making cuttable concrete having hardness and other properties permitting its use in ways that conventional concrete may be used, but having the additional property of being cuttable with conventional sculpting tools. After it is cast, the concrete product may be sandblasted to imitate the external appearance of a natural stone.

Although many of the prior art efforts have successfully attained the architectural shapes desired, none of them have produced an inexpensive cast product for simulating stone as an architectural feature in a building, wherein the casting is lightweight and durable in construction, with improved density and a surface texture which gives the desired appearance of high quality carved stone.

Because of the difficulty of producing a simulated stone product having the properties described above, cementitious concrete castings are the standards of the present day synthetic stone industry. The most popular casting methods are dry cast (Cast Stone) and wet cast (Pre-cast Concrete). Dry cast masonry materials (Cast Stone) more closely imitate a stone surface than any of the readily available substitutes. However, there are serious limitations with these products. Cast Stone is weak in tensile strength and is very porous. It can not be economically cast in complex shapes requiring curved surfaces or sharp arises. When complex shapes are achieved, the resulting castings are easily chipped. Cast Stone, like all other cementitious castings, are bulky and heavy. Moreover, larger castings must be steel reinforced. It is also susceptible to cracking and deterioration due to the freeze-thaw cycle experienced in northern climates.

In wet cast cementitious concrete, the look of stone is achieved by exposing the aggregate in the casting by chemically or mechanically removing the cement paste from the surface after the casting has hardened. When a large aggregate is used (¾ inch or larger) the process results in a stone-like appearance when viewed from a distance, but when viewed close up the casting is not the equivalent in appearance of carved stone. For instance, when cementitious concrete castings use a smaller aggregate (sand) they can achieve a closer similarity to carved stone, but the smaller aggregate makes the surface weaker and more porous and causes the casting to lose detail. In addition, because of the nature and strength of cementitious concrete, the castings are thick and heavy and fine detail can not be achieved.

Further, chemical or mechanical exposure of the aggregates leads to other problems, i.e., when chemical means are employed, satisfactory results occur on large aggregate castings, but surface imperfections occur when a small aggregate material such as sand is used. When mechanical means, e.g., sand blasting, is employed, surface imperfections such as air pockets are opened up on large aggregate castings and the surface appearance rapidly deteriorates. The smaller the aggregate, the more acute the problem. Therefore, fine stonelike finishes in wet cast cementitious concrete is a virtual impossibility.

In the past, applicant experienced difficulties when using resin binders in combination with various aggregate materials in an effort to solve the problems of prior art techniques.

For instance, a surface retarder can not be used with polyester resin binders during the casting process as is common with cementitious concrete castings. Previously, applicant used a chemical which broke down the polyester binder on the surface of the casting and then removed the chemical with soap and water. This resulted in a casting with a satisfactory look of carved stone because any air bubbles on the surface or just below the surface were filled with a mixture of fine aggregate and broken down resin which filled any surface imperfections during the stripping process. However, this process required the use of toxic and hazardous materials and was therefore uneconomical because of the environmental hazards of such materials and the increased costs associated with use of them. Applicant therefore sought to develop a more economical method of achieving a stone-like surface by using sandblasting. Although sandblasting is a very economical method of finishing a casting, the primary impediment to use of sandblasting as a finishing method is the presence of small air bubbles near the surface which open up and cause unsightly surface imperfections when the resin skim coat is removed.

Further, building components used for architectural detail such as door and window surrounds are typically manufactured in a desired shape and installed around the window and door openings prior to the time a brick mason or stone mason constructs the brick or stone facing of the building. Conventional window and door surrounds do not make any special provision for the brick or stone facing to be later applied. Consequently, the brick mason or stone mason must cut or notch the bricks or stones to accommodate the shape of the previously installed door and/or window surrounds, adding to the difficulty and cost of applying the brick or stone facing.

Accordingly, there is need for an economical, lightweight simulated stone product for use in the building industry, and especially wherein the simulated stone product is strong and durable and accurately simulates the appearance of high quality cut stone. Further, there is need for a building component for use in providing architectural detail to a building, e.g., window and door surrounds, which has provision for accommodating bricks or stones subsequently installed by a masonry worker, without the need for cutting or shaping the bricks or stones to accommodate the shape of the architectural detail building component.

SUMMARY OF THE INVENTION

An object of the invention is, therefore, to provide a simulated stone product which is economical to make and which is strong, durable and lightweight in construction and which has a high quality carved stone finish.

Another object of the invention is to provide a simulated stone product which enables a complex architectural casting to be made with a unique surface finish and texture that is as dense and consistent as a high quality carved stone surface, essentially free of air bubbles and pin holes perceptible to the naked eye to the same degree or better than a high quality limestone carving.

The fine stone-like surface in the complex casting of the invention is achieved by combining an unsaturated polyester resin of low viscosity with graded aggregates to produce a soupy mixture and then casting the mixture in a mold to cure. The mold is vibrated to remove air pockets from the surface of the casting and to align and reorient the aggregates such that the cured casting may be sandblasted to remove the resin binder skim coat yet not expose the surface imperfections and entrapped air bubbles that are generally found in masonry castings. Natural masonry materials are provided in particle sizes ranging from those large enough to visually present a natural stone appearance to those small enough to enable the product to be cast with a surface density that permits an economical method of surface treatment, such as sandblasting, to remove the resin binder skim coat.

The high strength, low viscosity polyester resin binder used in the invention enables a thinner coating of the aggregate particles, which in turn enables the aggregates to be more closely compacted than with typical resin binders, and it reduces the size of air bubbles formed in the matrix during mixing. It also permits the air bubbles to be pushed back into the matrix because of the greater densification of the solids adjacent the mold surface when the mold is subjected to vibration.

The resin binder used in the invention is much harder and stronger than cement, enabling much smaller particles to be held in the matrix under much more abrasive sandblasting than is possible with concrete materials. In concrete constructions, small aggregate particles are blasted out of the surface when subjected to even light sandblasting.

Further, the casting of the invention can be sandblasted aggressively enough to erode the surface of the small stone chips themselves, reducing significantly the amount of resin binder showing through the finished surface. The wearing away of the surface of adjacent small pieces of stone, closely concentrated on the surface, appears to the naked eye as a continuous stone surface. In order to maintain this appearance over an extensive surface area, it is essential that air bubbles and other voids on the surface of the finished product must be controlled to a size undetectable to the naked eye.

It will be observed that the casting itself is of relatively thin wall design, having a hollow rear surface to minimize the amount of material required and to make the casting lightweight in construction while still maintaining adequate strength for its intended use. In this regard, the castings are made to a nominal wall or shelf thickness of approximately ⅛ of an inch.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein.

DETAILED DESCRIPTION OF THE PREFERRED EMBODIMENTS

Figure 1:
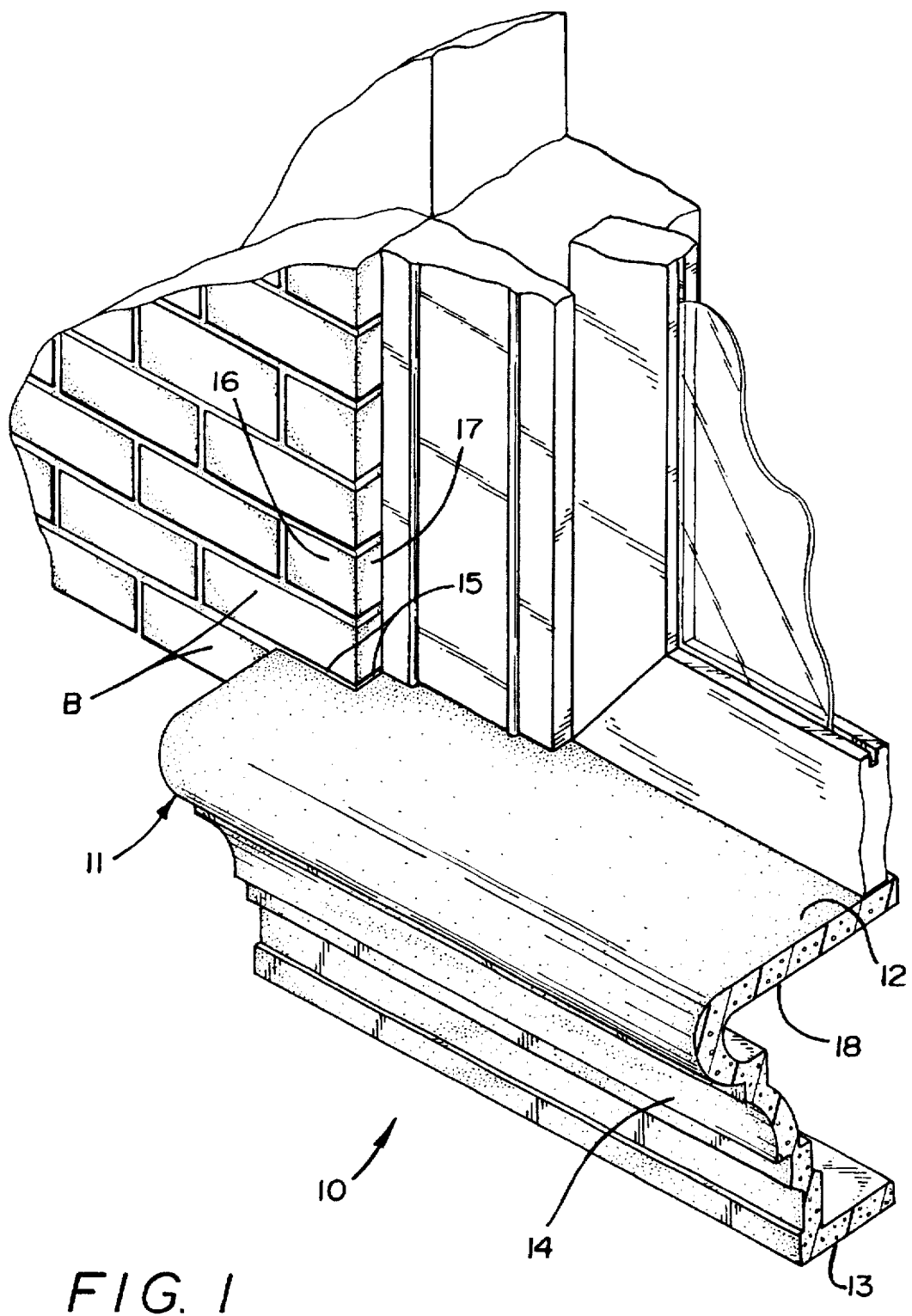
FIG. 1 is a fragmentary perspective view, with portions shown in section, of one form of cast simulated stone building component according to the invention, wherein the casting is utilized as a window sill.

With more specific reference to the drawings, a simulated stone casting according to the invention is indicated generally at 10 in FIG. 1. Although the principles of the invention may be applied to produce any casting that is to simulate high quality carved stone, the particular casting shown in FIG. 1 comprises a window sill 11. This particular window sill design has considerable architectural detail, including several curved surfaces and sharp angles. Regardless of the specific architectural details incorporated into the design, the window sill essentially comprises a top surface or ledge 12 and a vertically spaced bottom surface 13, with a shaped riser 14-extending between the front edges thereof.

Because the casting of the invention is intended for use with constructions having brick or stone facings or wall structures, the opposite ends of the window sill 11 are formed with a notched cut-out 15 that is sized and shaped to accommodate a straight run of bricks B without the need for cutting or shaping the bricks around the configuration of the window sill. This is perhaps best illustrated in FIG. 4, wherein the bricks B are shown in dot-and-dash lines. In this regard, it should be noted that when bricks are laid to form a wall, they are normally laid with a running bond, with vertical joints between horizontally adjacent bricks staggered in alternate rows or courses of bricks. The end most bricks 16 in alternating courses are cut in half so that the end surface 17 of the course of bricks framing the window opening extend in a straight line. With the notched cut-out 15 provided in the window sill of the invention the bricks can be easily and quickly laid in a straight run of brick courses without the need for cutting or shaping those bricks which extend upwardly alongside the shaped end of the window sill.

Figures 2, 3, 4:
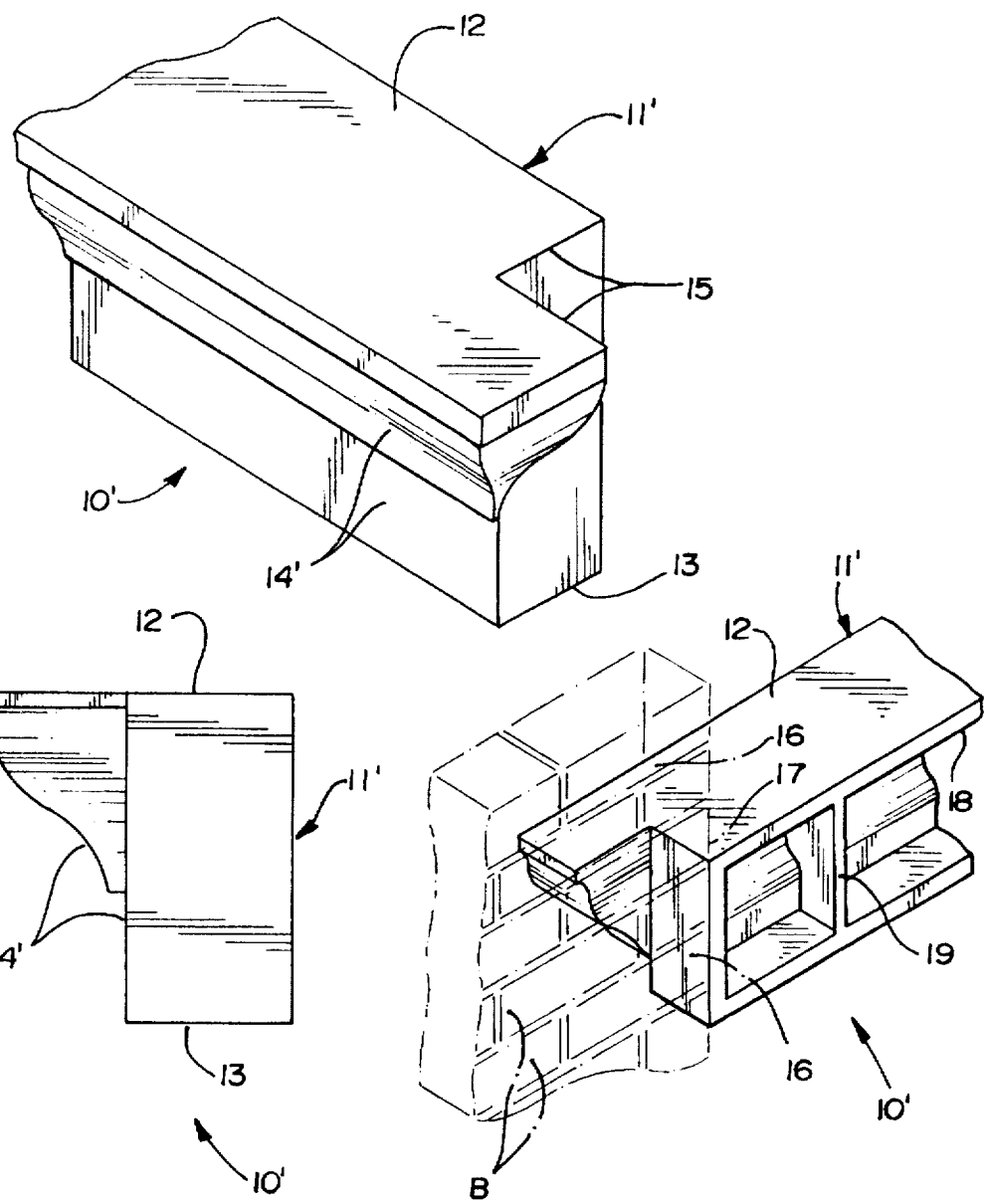
FIG. 2 is a fragmentary, top and front perspective view of a building component according to the invention, which may be used as a window head, or as a window sill for use as shown in FIG. 1, but depicting a slightly different architectural design detail.
FIG. 3 is an end view in elevation of the building component of FIG. 2.
FIG. 4 is a rear, top fragmentary perspective view of the building component of FIG. 2.

The casting 10' shown in FIGS. 2–4 could be used as a window head, or as a window sill 11' having an upper surface 12 and bottom surface 13 and notched cut-outs 15 in its opposite ends, but the front wall 14' extending between the front edges of the top and bottom surfaces 13 has a different architectural design than that shown in FIG. 1. In all other respects, the window sill 11' functions the same as the window sill 11.

Figure 7:
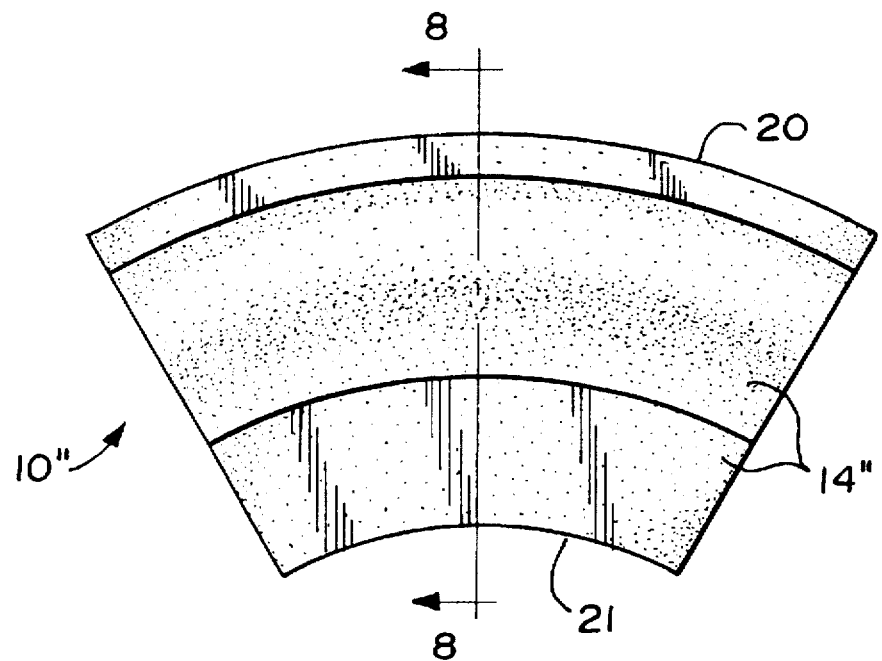
FIG. 7 is a front view in elevation of a further form of casting which may be made in accordance with the invention, wherein the casting is part of an arched or curved architectural feature.
Figure 8:
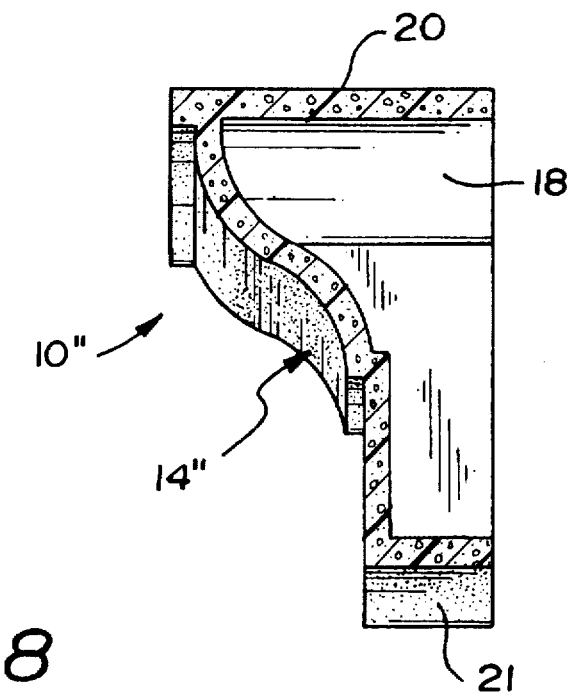
FIG. 8 is a transverse sectional view taken along line 8—8 in FIG. 7.
Figure 9:
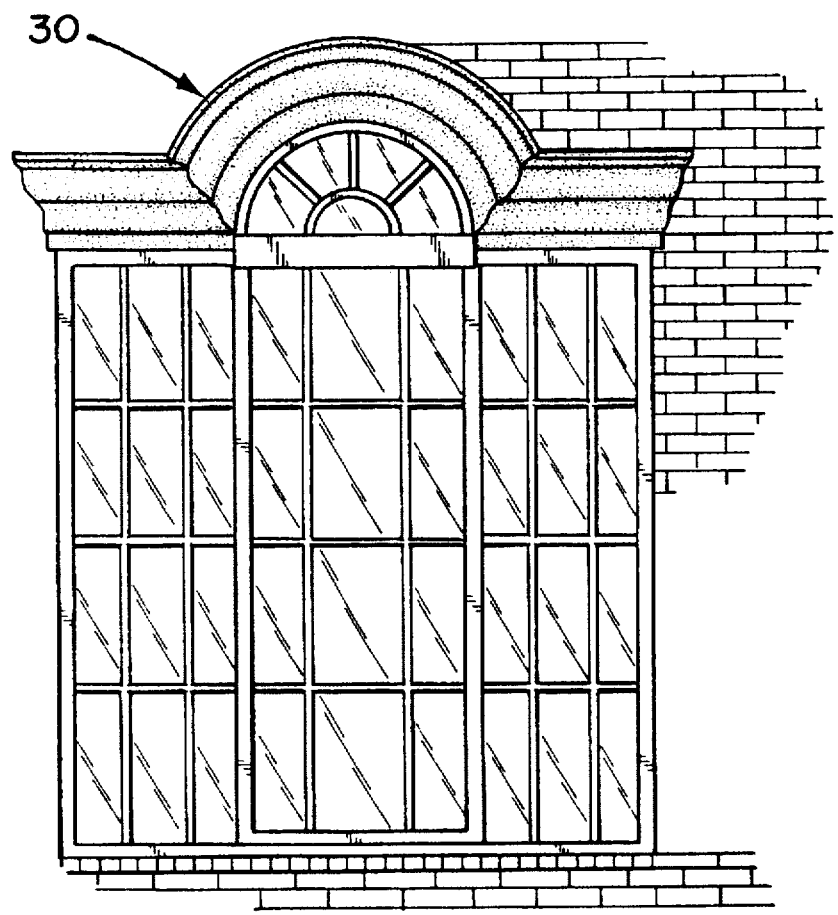
FIG. 9 is a front view in elevation of an example of use of the casting according to the invention for a window header in a building having brick walls.
Figure 10:
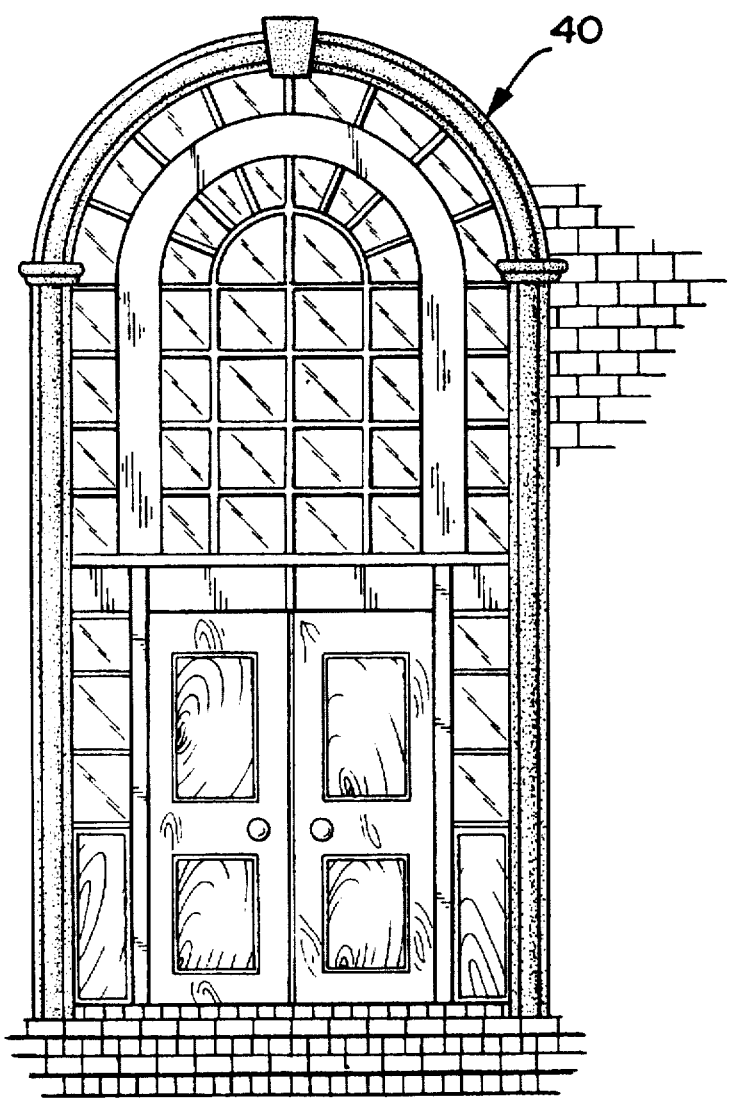
FIG. 10 is a front view in elevation of a further example of use of the castings of the invention in the surround for a door opening.

Yet another casting design 10" is illustrated in FIGS. 7 and 8. The casting 10" is an arcuately shaped piece intended for use to form an arched structure as indicated at 30 in FIG. 9, or 40 in FIG. 10, for example.

As seen best in FIGS. 1, 4 and 8, the casting of the invention, regardless of its particular design or the specific function it is to preform, has a thin wall construction. Thus, the top wall 12, bottom wall 13 and front wall 14 all have a relatively thin cross-sectional dimension and the thickness is substantially constant throughout. This is accomplished by using male and female mold halves during the casting process, with the cavity 18 at the rear of the casting being formed by the male mold half.

Because of the thin wall construction, it may be desirable to provide transverse reinforcing webs 19 at strategic locations to prevent deformation of the casting. See FIG. 4.

As noted previously, the only difference between the casting 10" shown in FIGS. 7 and 8 and those castings previously described, is that the top and bottom surfaces 20 and 21, respectively, are arcuately shaped. The configured front wall 14" in this casting may have any suitable design, and as shown is similar to the design 14' embodied in the casting shown in FIGS. 2–4.

All of the castings described above comprise a transition from the brick wall to the window or door opening, and the notched cut-outs 15 at opposite ends of the castings enable a straight run of bricks to be made, contributing to the economy and ease of use of the invention. However, the invention resides in the composition of the casting, as described hereinafter.

Figures 5, 6:
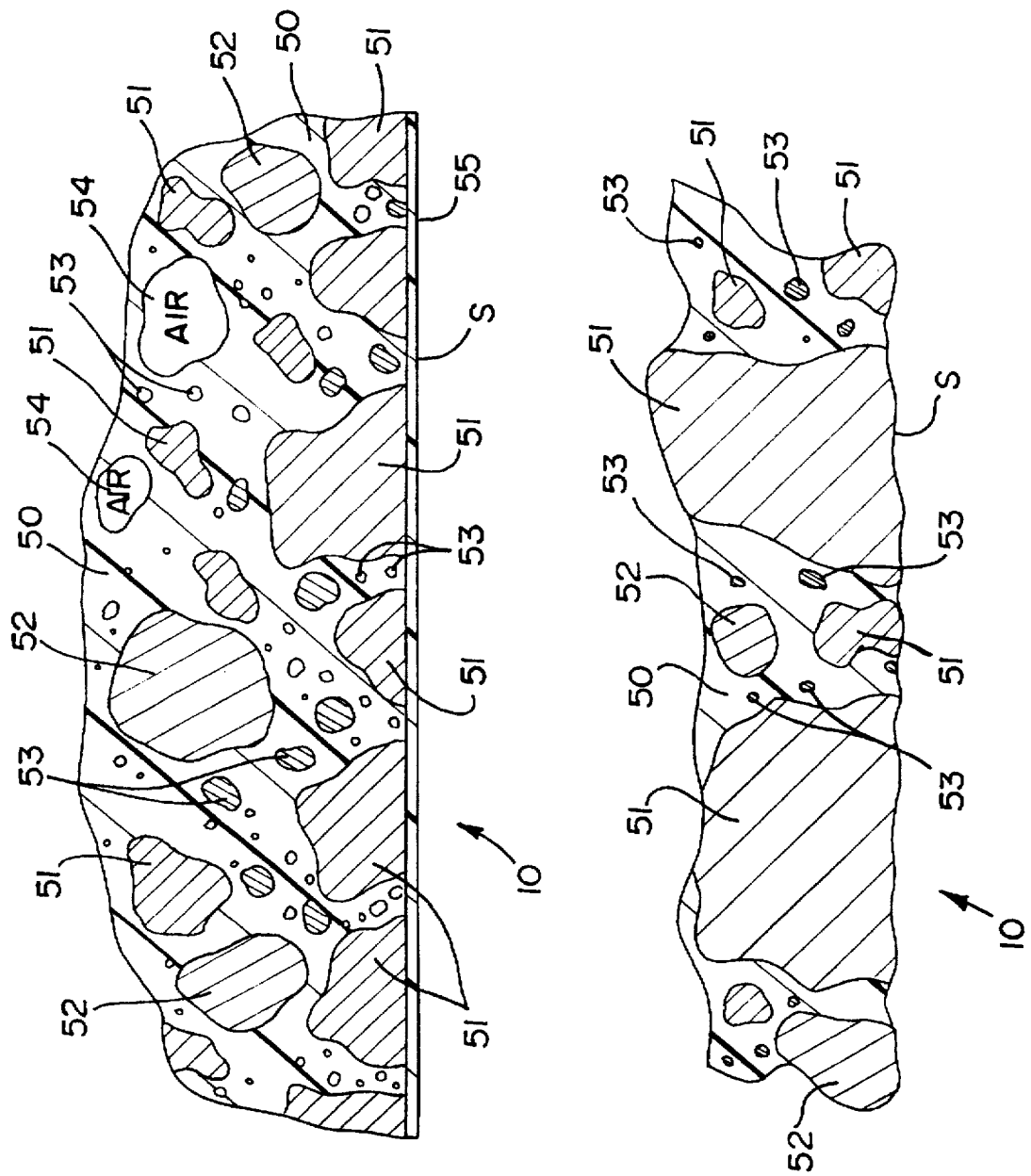
FIG. 5 is a greatly enlarged somewhat schematic fragmentary sectional view of a portion of a casting according to the invention, showing the matrix of resin and imbedded aggregate materials.
FIG. 6 is a further enlarged fragmentary sectional view of a portion of a casting according to the invention, after sandblasting of the surface to expose and erode away portions of the aggregate and resin matrix.

FIGS. 5 and 6 illustrate this composition with reference to a greatly enlarged fragmentary portion of the casting 10. With reference initially to FIG. 5, the casting 10 comprises a matrix 50 of polyester resin surrounding and bonding together a mixture of graded aggregates including larger angularly shaped pieces of crushed limestone 51, particles 52 of round silica sand and particles 53 of crushed calcium carbonate. In addition, pockets of air 54 will be present in the matrix 50, although these air pockets or bubbles are spaced from the surface S of the casting as depicted in FIG. 5. A thin skim layer 55 of resin will form on the face or surface S of the casting when it is molded. Thus, in order to achieve the simulation of carved stone desired by this invention, it is necessary to treat the surface to remove this skim coat or layer 55.

With reference to FIG. 6, a further enlarged fragmentary portion of the casting 10 is depicted as it may appear after the surface S has been sandblasted to remove the skim coat 55. Moreover, the act of sandblasting the surface also erodes away small amounts of the exposed surfaces of the aggregate materials, exposing the strata of the stone of which this aggregate material is constituted, resulting in an almost continuous exposure of the stone through the surface of the casting, and producing a very realistic simulation of high quality carved stone.

With further reference to FIGS. 5 and 6, it will be noted that the particulate matter is concentrated toward the surface S of the casting, and the air bubbles 54 are pushed rearwardly in the matrix, resulting in a more dense structure at the surface of the casting. Additionally, it will be noted that the larger aggregate particles 51 are oriented with their larger flat faces disposed toward the surface S, whereby maximum surface area of the crushed limestone particles is exposed through the surface of the casting.

The resin binder used in the casting of the invention is a high strength, low viscosity unsaturated polyester resin, and may comprise that sold under the trademark "Polylite" 32-138 by Reichhold Chemicals, Inc. of Research Triangle Park, N.C. This resin has a viscosity of 100–200 centipoise (CPS) as measured on a Brookfield Model LVF #2 spindle at 60 rpm. This resin binder is much harder and stronger than cement, enabling much smaller particles to be held in the matrix under more abrasive sandblasting than is possible with concrete materials. Additionally, this low viscosity resin enables a thinner coating of the aggregate particles, which in turn enables the aggregate to be more closely compacted than with typical resin binders, and it reduces the size of air bubbles formed in the matrix during mixing. It also permits the air bubbles to be forced back into the matrix because of the greater densification of the solids adjacent the surface of the casting when the mold is subjected to vibration.

Additionally, the aggregates are selected for size, shape and mineral content to achieve the desired surface texture end result. The aggregate mixture used in the casting of the invention comprises approximately one third each of: crushed limestone chips; round silica sand; and ground calcium carbonate. The crushed limestone chips are polygonally shaped, with sharp edges and angular surfaces, and a particle size bell-curve distribution in the range of 150–1, 000 microns, with a specific gravity of 3.1. This aggregate functions to provide the stone appearance in the final product. The angular nature and particle size of this aggregate is selected to enhance this effect, i.e., the heavier angular particles tend to settle toward the surface of the casting during the molding process, and the particles tend to be oriented with their larger, flatter surfaces oriented toward the mold surface. The particle sizes are large enough to cover the majority of the surface and yet small enough to maintain small joints between adjacent particles. When the cast article is sandblasted, not only is the resin binder skim coat removed, but a small amount of the stone aggregate is also eroded away, exposing the strata of the stone on the surface of the cast product.

The silica sand aggregate comprises a round quartz approximately 300–600 microns in size, and with a specific gravity of 2.65, and may comprise that identified as Flint Silica #15, sold by U.S. Silica of Ottawa, Ill. Both the density and the shape of the silica will cause it to migrate away from the face of the mold relative to the more dense limestone particles, especially under vibration. This contributes to the concentration of limestone at the mold surface, while still enabling the sand particles to be distributed among the limestone particles.

The ground calcium carbonate has a size range of 2–25 microns, with a specific gravity of 2.7 and may comprise that identified as GSP-40, sold by Genstar Stone Products Company of Hunt Valley, Md. The small particle size of this material enables it to be mixed thoroughly with the resin binder to form a paste which fills the remaining voids between the limestone and silica. This paste coats the limestone and silica particles during the mixing process, and this matrix, when subjected to vibration, behaves in a unique manner. Besides the action of the aggregates, as described above, the air bubbles on the surface are driven up and away from the mold surface and into the matrix. This leaves a dense, essentially air-bubble-free thickness of matrix on the surface of the casting. Air bubbles greater than 200 microns are driven more than 3,000 microns from the mold surface. This is an important element of the present invention, because this thickness of air-bubble free matrix is necessary for the sandblasting to evenly etch the surface of the casting. Air bubbles on the surface greater than about 200 microns would be opened up by the sand blasting and the surface continuity needed to achieve the carved stone appearance would be lost.

In producing a casting according to the invention, solid aggregates of crushed limestone, ground calcium carbonate and round quartz are thoroughly dried and premixed in proportions of approximately one third each. The crushed limestone chips have a particle size in the range of about 150 to about 1,000 microns, the majority of them being in the 200–500 micron range, and with a specific gravity of 3.1.

The ground calcium carbonate has a size range of about 2 to about 25 microns and a specific gravity of 2.7, with the majority of these particles having a size of about 10 microns.

The silica sand particles range in size from about 300 up to about 600 microns and have a specific gravity of 2.65. The majority of the silica sand particles have a size of 400 to 500 microns.

Approximately 500 grams of pigment for coloration, if desired, is then added to approximately 5 gallons of resin and thoroughly mixed to uniformly distribute the pigment throughout the resin. Immediately prior to casting, a catalyst is mixed with the pre-pigmented resin and the premixed solids are immediately added to the resin mix and blended as quickly as possible. This mixture is then immediately poured into the female half of the mold, up to a predetermined level, and the male or back half of the mold is then positioned into the cavity of the female mold in spaced relationship thereto to define a shaped cavity in which the article to be cast will be molded. The loaded mold is then vibrated for approximately 2–5 minutes, depending upon the size, i.e., weight and thickness of the casting.

The casting normally takes an initial set in about 10–20 minutes, at which time the male or back half of the mold is removed. After permitting the casting to cure for about ½ to 1½ hours, depending upon the thickness of the casting section, it is then removed from the female mold half. Following removal from the mold, the casting may be placed in a jig to control warping during the initial curing period of 8–16 hours. After the casting is cured, it is sandblasted to achieve the desired surface appearance. Sandblasting may be accomplished at a pressure of about 100 psi.

The casting of the invention is superior in appearance and structure to conventional products, and provides an economical alternative to carved stone.

While particular embodiments of the invention have been illustrated and described in detail herein, it should be understood that various changes and modifications may be made to the invention without departing from the spirit and intent of the invention as defined by the scope of the appended claims.

What is claimed is:

1. A simulated stone casting for use as a building component in lieu of natural carved stone and cementitious materials, especially to provide fine architectural detail and transition between masonry structures and window and door openings, wherein:

said casting is molded with a predetermined shape and thin wall construction, with a front surface to be exposed to view during use, and comprises a matrix of polyester resin surrounding and bonding together a mixture of graded aggregate particles including predetermined proportions of crushed limestone, silica sand and calcium carbonate, said aggregate particles being concentrated at the front surface, with a substantial portion of the crushed limestone particles exposed through the front surface, and only small interstices of resin matrix exposed at the surface between the particles; and said front surface is sandblasted to remove any resin film from the front surface and to etch exposed surfaces of the aggregate particles to produce a textured front surface on the casting made up primarily of exposed portions of the aggregate particles, thereby simulating the appearance of carved stone.

2. A simulated stone casting as claimed in claim 1, wherein:
the resin comprises an unsaturated polyester resin; and
the crushed limestone, silica sand and calcium carbonate are provided in substantially equal proportions.

3. A simulated stone casting as claimed in claim 2, wherein:
the crushed limestone has a particle size of from about 150 microns up to about 1,000 microns.

4. A simulated stone casting as claimed in claim 3, wherein:
the silica sand has a particle size of from about 300 microns up to about 600 microns.

5. A simulated stone casting as claimed in claim 4, wherein:
the calcium carbonate comprises ground calcium carbonate having a particle size in the range of from about 2 microns up to about 25 microns.

6. A simulated stone casting as claimed in claim 5, wherein:
the crushed limestone has a specific gravity of about 3.1, the silica sand has a specific gravity of about 2.65, and the calcium carbonate has a specific gravity of about 2.7.

7. A simulated stone casting as claimed in claim 1, wherein:
the resin has a viscosity of from about 100 centipoise up to about 200 centipoise.

8. A simulated stone casting as claimed in claim 7, wherein:
the crushed limestone has a particle size of from about 150 microns up to about 1,000 microns;
the silica sand has a particle size of from about 300 microns up to about 600 microns; and
the calcium carbonate comprises ground calcium carbonate having a particle size in the range of from about 2 microns up to about 25 microns.

9. A simulated stone casting as claimed in claim 7, wherein:
the crushed limestone, silica sand and calcium carbonate are provided in substantially equal proportions.

10. A simulated stone casting as claimed in claim 9, wherein:
the crushed limestone and silica sand have similar particle sizes, and the calcium carbonate has a particle size that is substantially smaller.

11. A simulated stone casting as claimed in claim 10, wherein:
the crushed limestone has a particle size range of from about 150 microns up to about 1,000 microns, with most of the particles having a size in the 200–500 micron range;
the silica sand has a particle size range of from about 300 microns up to about 600 microns, with most of the particles having a size in the range of 400–500 microns; and
the calcium carbonate has a particle size range of from about 2 microns up to about 25 microns, with most of the particles having a size of about 10 microns.

12. A simulated stone casting as claimed in claim 1, wherein:
the crushed limestone has sharp, angular edges and flat surfaces, and is oriented with a flat surface thereof exposed through the front surface of the casting.

13. A simulated stone casting as claimed in claim 1, wherein:
said casting comprises a window sill having vertically spaced top and bottom walls, a front wall, and opposite ends; and
said opposite ends are notched to accommodate courses of masonry, whereby the window sill may be installed and a straight run of masonry made past the sill without the need to cut or shape the masonry to adapt the masonry to the shape of the window sill.

14. A simulated stone casting as claimed in claim 13, wherein:
said window sill has an open back and hollow interior, with the top and bottom walls and said front wall having a thin wall of substantially uniform thickness.

15. A simulated stone casting as claimed in claim 14, wherein:
the resin comprises an unsaturated polyester resin; and
the crushed limestone, silica sand and calcium carbonate are provided in substantially equal proportions.

16. A simulated stone casting as claimed in claim 15, wherein:
the resin has a viscosity of from about 100 centipoise up to about 200 centipoise.

17. A building component for use as a transition between masonry structure and window and door openings, as a fireplace surround, or for providing architectural accent to a structure, comprising:
a casting with a front surface exposed to view when in use and that simulates carved stone in appearance, said casting having an open rear surface and a hollow interior defining a thin wall structure of substantially uniform thickness, wherein said casting comprises a matrix of polyester resin surrounding and bonding together a mixture of graded aggregate particles including predetermined proportions of crushed limestone, silica sand and calcium carbonate, said aggregate particles being concentrated at the front surface, with a substantial portion of the crushed limestone particles exposed through the front surface, and only small interstices of resin matrix exposed at the surface between the particles; and
said front surface is sandblasted to remove resin film from the front surface and to etch exposed surfaces of the aggregate particles to produce a textured front surface on the casting made up primarily of exposed portions of the aggregate particles, simulating the appearance of carved stone in a lightweight and easy to handle structure to thereby facilitate installation and minimize cost.

18. A building component as claimed in claim 17, wherein:
said casting comprises a window sill having top and bottom walls, a contoured front wall and contoured opposite ends; and said opposite ends are notched to accommodate courses of masonry, whereby said masonry may be installed in a straight run without the need to shape the masonry to fit the contoured window sill.

19. A building component as claimed in claim 17, wherin:

the resin has a viscosity of from about 100 centipoise up to about 200 centipoise.

20. A building component as claimed in claim 19, wherein:

the aggregate comprises substantially equal proportions of crushed limestone chips, silica sand and calcium carbonate.

21. A building component as claimed in claim 20, wherein:

the crushed limestone has a particle size range of from about 150 microns up to about 1,000 microns, with most of them being in the 200–500 micron range;

the silica sand has a particle size range of from about 300 microns up to about 600 microns, with most of them being in the range of 400–500 microns; and the calcium carbonate has a particle size range of from about 2 microns up to about 25 microns, with most of them having a size of about 10 microns.

\* \* \* \* \*